July 17, 1951  M. A. RICHARDSON  2,561,136
OVERLOAD RELEASE COUPLING
Filed July 4, 1945  2 Sheets-Sheet 1

Inventor
Martin A. Richardson
By Thiess Olson & Mecklenburger
Attys.

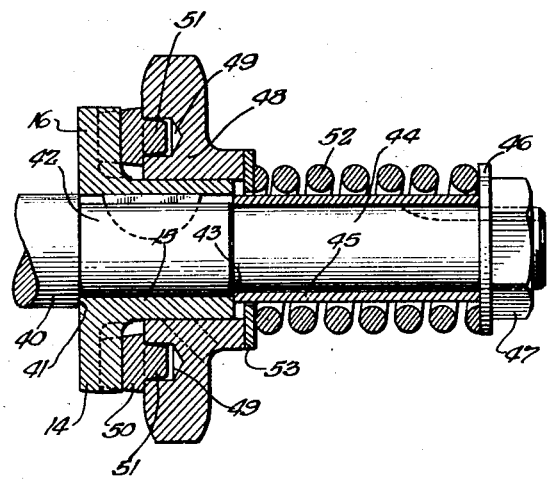
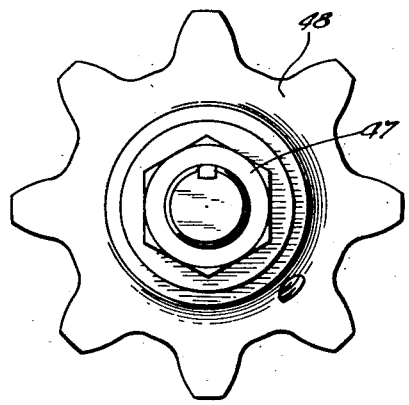
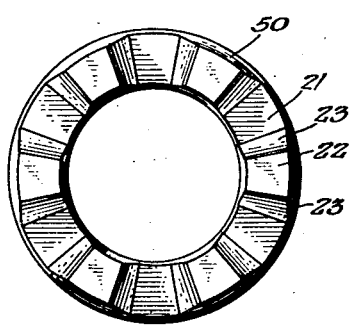
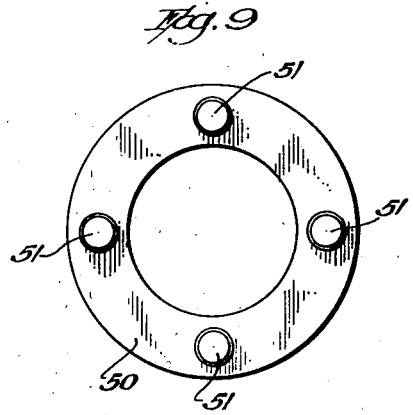
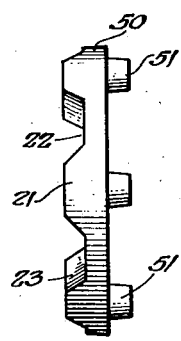

Patented July 17, 1951

2,561,136

UNITED STATES PATENT OFFICE 2,561,136

OVERLOAD RELEASE COUPLING

Martin A. Richardson, Racine, Wis., assignor to J. I. Case Company, Racine, Wis., a corporation of Wisconsin Application July 4, 1945, Serial No. 603,129

1 Claim. (Cl. 64—29)

This invention relates to overload release or jump clutches adapted to be incorporated in right-angle driving trains, more particularly to clutch and drive mechanisms for agricultural machinery, and the invention has for an object the provision of inexpensive, rugged and compact mechanisms of this character.

In varying types of agricultural machinery, such as combines, pickers, harvesters and mowers, for example, it is common practice to provide an overload release or jump clutch in the driving trains between the power shafts and the work-performing implements, such for example as the cutters of mowing machines or the bundle carriers of harvesters, in order to provide overload relief and avoid breakage of the parts in the event that the work-performing implement should become jammed.

Where the overload release or jump clutch is part of a right-angle drive embodying a chain and sprocket for example, it has been proposed to employ the sprocket itself as one element of the clutch by forming suitable serrations or notches on one face of the sprocket at the time the sprocket is cast. It has been found advisable, however, and in fact necessary when the chain drive embodies close centers or when roller chains are used, to construct the jump clutch in such a manner that the sprocket will remain axially stationary on the shaft and will not oscillate during the jumping action. In other drives, where light loads are involved and light ribbon chains on relatively well-spaced centers are employed, movement of the sprocket during jumping of the clutch may not be objectionable and in such cases less costly constructions may be employed. In either case, however, the use of cast clutch parts is objectionable, since the clutch faces wear out rather quickly even though the parts are cast with a chilled face, and the forming of the clutch face integral with the sprocket militates against standardization and increases replacement expense.

Accordingly, it is a further object of this invention to provide improved jump clutch constructions for right-angle drives in which only a few drop-forged parts are employed, which parts may be used interchangeably in different clutch structures to provide compact and rugged jump clutches having a long operating life.

In carrying out the invention in one form, a right-angle drive, including driving and driven torque-transmitting elements one of which comprises a rotatable shaft and the other of which comprises a toothed element journaled for rotation relative to the shaft, is provided with a clutch mechanism which includes a first clutch member secured to the shaft and having a radially extending disc portion one face of which includes means forming a serrated clutch surface. Surrounding the shaft adjacent the disc portion is an annular clutch member having a coacting serrated clutch surface, and means are provided for mounting the annular member for rotation in torque-transmitting relation with the toothed element and for axial movement relative to the shaft and the first clutch member. Spring means normally urging the annular member toward the first clutch member to maintain the serrated surfaces in clutching engagement so as to transmit torque between the driving and driven elements are provided, the spring means being yieldable under overload conditions on the serrated faces to permit axial movement of the annular member out of clutching and torque-transmitting engagement with the first clutch member.

For a more complete understanding of the invention, reference should now be had to the drawings in which:

Fig. 6 is an elevational sectional view of another form of jump clutch construction embodying the invention;

Fig. 7 is an end view of the clutch construction shown in Fig. 6;

Fig. 8 is a front face view of one of the clutch members employed in the construction of Fig. 7;

Fig. 9 is a rear face view of the clutch member shown in Fig. 8; and

Fig. 10 is a side elevational view of the clutch member shown in Figs. 8 and 9.

Figure 1:
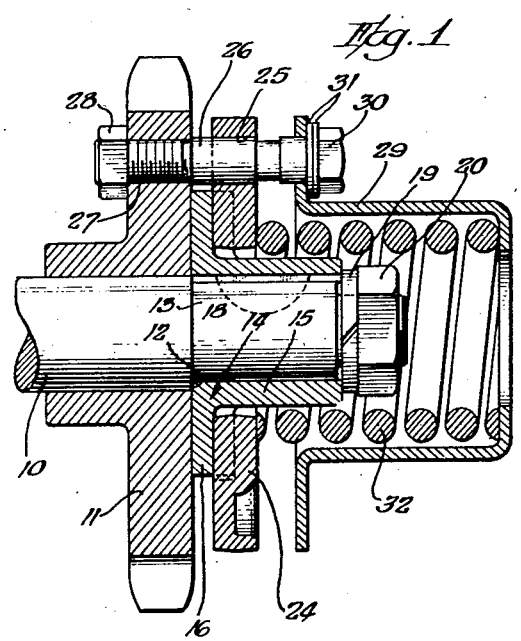
Fig. 1 is an elevational sectional view showing a jump clutch construction embodying the present invention.
Figure 2:
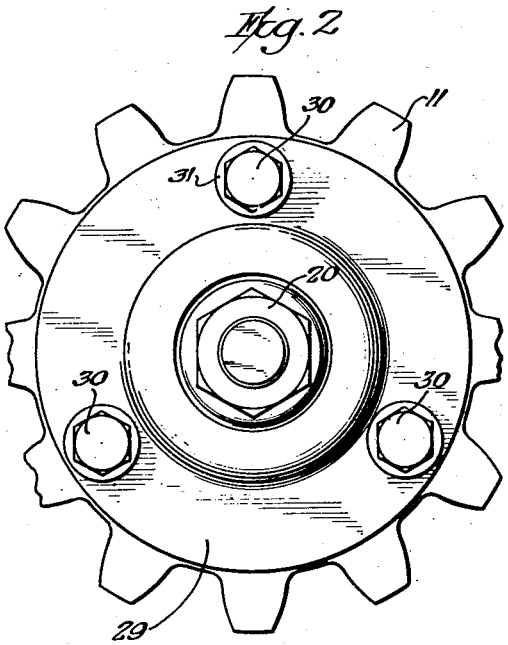
Fig. 2 is an end view of the clutch construction shown in Fig. 1.

Referring now to the drawing, the invention is shown as embodied in a jump clutch mechanism for a right-angle drive comprising a driving shaft 10 and a driven toothed element 11. Although the driven toothed element 11 is shown as comprising a simple sprocket adapted to be engaged by a suitable chain (not shown), it will be understood that various other types of rotatable elements having torque transmitting peripheries may be employed, and in fact the element 11 may be in the form of a pulley, sprocket, gear or cog. Likewise, it will be understood that the toothed element 11 may constitute the driving member of the right-angle drive and the shaft 10 may be the driven member.

Figure 3:
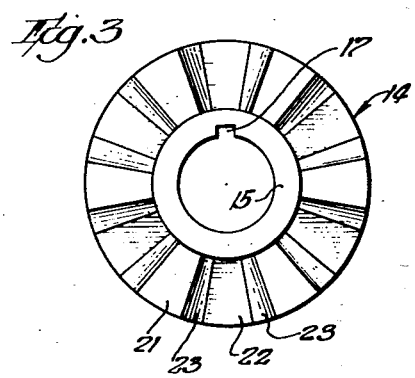
Fig. 3 is an elevational detail view of one of the clutch members employed in the clutch construction of Fig. 1.
Figure 5:
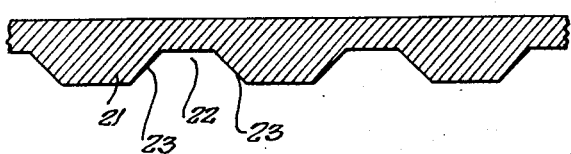
Fig. 5 is a fragmentary developed view showing the shape of the clutching members of Figs. 3 and 4.

The shaft 10 is provided as shown with a shoulder 12 which defines a reduced end portion 13 on which is mounted a clutch member 14 having a hub 15 and a radially extending disc portion 16. The hub portion 15 is provided with a keyway 17 for receiving a Woodruff key 18 whereby the clutch member is secured against rotation relative to the shaft. As shown, the left-hand end of the clutch member 14 abuts against the shoulder 12 on the shaft 10 and is retained against axial movement on the shaft by a suitable washer 19 and a nut 20 which threadedly engages the end of the shaft. The face of the disc portion 16 of the clutch member 14 remote from the toothed element 11 is serrated, as shown best in Figs. 3 and 5, to provide alternate ridges 21 and notches 22 having sloping surfaces 23. Although these serrations may be formed in any suitable manner, they are preferably formed so as to extend at an angle of approximately 45 degrees, which angularity has been found to provide satisfactory torque transmission while permitting jumping of the clutch under excessive loads.

Figure 4:
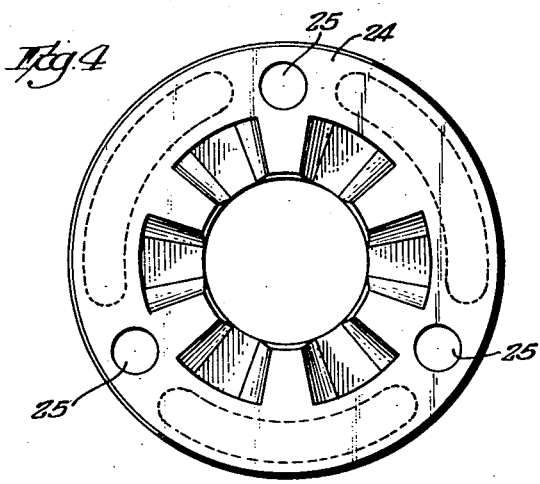
Fig. 4 is a similar detail view of the other clutch member employed in the clutch construction of Fig. 1.

Disposed adjacent the clutch member 14 is an annular clutch member 24 which is provided on one face with coacting serrations similar to those on the clutch member 14, as shown best in Fig. 4. Outwardly of the clutching surface provided by the serrations, the clutch member 24 is provided with a plurality of circumferentially spaced holes 25 for slidably receiving suitable supporting pins 26 carried by the toothed element 11. As shown best in Fig. 1, the pins 26, only one of which is shown, are provided with threaded ends 27 which extend through suitable holes in the toothed element 11 and are secured to the toothed element 11 by nuts 28.

Mounted on the outer ends of the pins 26 is a cup-shaped spring-supporting member 29 which is retained on the pins 26 by suitable nuts or heads 30 and washers 31, and a clutch spring 32 is mounted within the spring support 29, one end of the spring engaging the spring cup 29 and the opposite end of the spring bearing against the annular clutch member 24 so as to normally maintain the clutch member 24 in clutching engagement with the clutch member 14.

The supporting pins 26 as well as the clutch members 14 and 24 may readily be formed by drop forging and hardening. Thus hardened clutch surfaces are provided and the holes in the annular clutch member 24 and the pins 26 have hard smooth working surfaces thereby providing the best possible sliding conditions. The arrangement of the clutch pins and the co-operating holes 25 adjacent the periphery of the clutch member 24 permits accurate centering of the clutch member and the elimination of wobble from the clutch.

It will be apparent from the foregoing that when the shaft 10 and the toothed element 11 are subjected to loads below a predetermined value the spring 32 retains the clutch members in torque-transmitting relation so as to couple the driving and driven elements 10 and 11. However, upon the occurrence of an overload the forces acting on the sloping surfaces 23 on the clutch members will cause the annular member 24 to move to the right, as viewed in Fig. 1, on the pins 26 against the force exerted by the spring 32, and will thus cause the clutch to jump or slip thereby preventing breakage of the machine itself or of parts of the right-angle drive. It will be observed that during jumping action the toothed element 11 is maintained in its axial position on the shaft in abutment with the clutch member 16 by the force exerted on the pins 26 by the spring 32. Thus, jumping of the clutch is effected without displacement or oscillation of the toothed element 11 on the shaft. The use of a single large spring for urging the clutch member 24 into clutching engagement in place of a plurality of smaller springs, as previously used in jump clutch constructions, is of particular advantage, since it has been found that the small springs have a tendency to vibrate at their natural frequency of vibration and often break or cause the various parts of the clutch to become excessively worn due to the high frequency of vibration.

In Figs. 6 to 10 a somewhat simpler form of jump clutch construction is shown which is suitable for somewhat lighter loads than the clutch construction shown in Figs. 1 to 5, and which differs in that the toothed element moves axially of the shaft during jumping of the clutch. As shown, this modified clutch construction comprises a shaft 40 having a shoulder 41 providing a reduced shaft portion 42 and a second shoulder 43 providing a further reduced shaft portion 44. Mounted on the reduced portion 42 of the shaft 40 and suitably keyed thereto is a clutch member identical with the clutch member 14 in the previously described embodiment of the invention, and which is identified in Fig. 6 by the same reference numerals. The clutch member 14 is retained in fixed axial position on the shaft 40 by a bushing 45 which engages the outer end of the hub 15 of the clutch member 14, the bushing 45 surrounding the shaft 44 and being retained against endwise movement by a washer 46 and a nut 47 which threadedly engages the end of the shaft. Journaled on the hub 15 of the clutch member 14 for rotation and for axial movement with respect thereto is a toothed element or sprocket 48, one face of which is provided with a plurality of holes or sockets 49 for supporting in torque-transmitting relation an annular clutch member 50. As shown in Figs. 8, 9 and 10, the clutch member 50 is provided on one face with a plurality of lugs or pins 51 adapted to be received in the sockets 49 of the toothed element 48, and the opposite face of the clutch member 50 is provided with serrations corresponding to the previously described serrations on the clutch element 14.

Surrounding the bushing 45 is a spring 52 one end of which bears against a washer 53 which in turn engages the hub of the toothed element 48. Thus the spring 52 serves to maintain the clutch members 14 and 50 in clutching torque-transmitting engagement and to maintain the clutch member 50 in torque-transmitting engagement with the sprocket 48 by means of the pins 51 and the sockets 49. On the occurrence of overload conditions the clutch member 50 and the sprocket 48 will move to the right, as viewed in Fig. 6, against the force of the spring 52 so as to interrupt the torque-transmitting relation between the shaft 40 and the sprocket 48 and thus prevent breakage or damage to parts of the driving train.

The clutch member 50 may be formed by drop forging in the same manner as the clutch member 14, and thus hardened clutching surfaces are provided. In case of wear on the clutching surfaces, it is not necessary to replace the entire sprocket 48 but instead a new clutch member 50 may be provided, thus eliminating expense and permitting continued used of the sprocket 48. If desired, two clutch members identical with the clutch member 50 may be provided and the disc portion of the clutch member 14 may be provided with apertures similar to the apertures 49 in the sprocket 48 for receiving the supporting pins 51 on the second clutch member 50. In this case, of course, the serrations on the disc portion of the clutch member 14 would be omitted, and in such a construction either or both of the clutch members 50 can be readily replaced in case of excessive wear.

While I have shown particular embodiments of my invention, it will be understood, of course, that I do not wish to be limited thereto since many modifications may be made, and I, therefore, contemplate by the appended claim to cover any such modifications as fall within the true spirit and scope of my invention.

Having thus described my invention, what I claim and desire to secure by Letters Patent is:

An overload release clutch mechanism for a right-angle drive including driving and driven torque-transmitting elements, one of said elements comprising a rotatable shaft and the other comprising a rotatable element journaled for rotation relative to said shaft and having a torque-transmitting periphery, said clutch mechanism comprising a first clutch member secured to said shaft and having a radially extending disc portion, said disc portion having means on one face thereof forming a serrated clutching surface, an annular clutch member surrounding said shaft adjacent said disc portion and having a coacting serrated clutching surface, means mounting said annular member for rotation in torque-transmitting relation with said other torque-transmitting element and for axial movement relative to said shaft and said first clutch member, spring means normally urging said annular member toward said first clutch member to maintain said serrated surfaces in clutching engagement to transmit torque between said elements, said spring means being yieldable under overload conditions on said serrated faces to permit axial movement of said annular member out of said clutching and torque-transmitting engagement, said first clutch member having a hub portion secured to said shaft and extending through said annular member, the walls of the opening in said annular member being spaced a substantial distance from the surrounded hub portion, said spring means comprising a coil compression spring surrounding said shaft.

MARTIN A. RICHARDSON.

REFERENCES CITED

The following references are of record in the file of this patent:

UNITED STATES PATENTS

| Number | Name | Date |
|---|---|---|
| 954,774 | Beard | Apr. 12, 1910 |
| 2,333,553 | Potgieter et al. | Nov. 2, 1943 |
| 2,366,841 | Dodge | Jan. 9, 1945 |
| 2,375,020 | Mitchell | May 1, 1945 |

FOREIGN PATENTS

| Number | Country | Date |
|---|---|---|
| 418,543 | Great Britain | 1934 |
| 607,351 | Germany | 1934 |